US009875649B2

(12) United States Patent
King et al.

(10) Patent No.: US 9,875,649 B2
(45) Date of Patent: Jan. 23, 2018

(54) REMOTE CONTROL SYSTEMS FOR VEHICLES

(71) Applicant: Lear Corporation, Southfield, MI (US)

(72) Inventors: Ronald O. King, Brownstown, MI (US); Craig Elder, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 277 days.

(21) Appl. No.: 14/146,951

(22) Filed: Jan. 3, 2014

(65) Prior Publication Data

US 2014/0313009 A1 Oct. 23, 2014

Related U.S. Application Data

(60) Provisional application No. 61/814,370, filed on Apr. 22, 2013.

(51) Int. Cl.
*G05B 19/00* (2006.01)
*G08C 17/02* (2006.01)

(52) U.S. Cl.
CPC .................................... *G08C 17/02* (2013.01)

(58) Field of Classification Search
CPC ...... G07C 9/00309; G07C 2009/00793; B60R 25/24
USPC ........... 340/5.61, 5.72; 307/10.1, 10.2, 10.4; 180/287
See application file for complete search history.

(56) References Cited

U.S. PATENT DOCUMENTS 4,763,121 A 8/1988 Tomoda et al.
8,224,313 B2 7/2012 Howarter et al.
8,373,541 B2 2/2013 Tarmoom et al.
8,836,477 B2 9/2014 Hiramine
8,995,914 B2 3/2015 Nishidai
2008/0246586 A1 10/2008 Hiramine
2009/0096575 A1 4/2009 Tieman
2009/0096576 A1 * 4/2009 Oman .................... G07C 5/008 340/5.62
2009/0096596 A1 * 4/2009 Sultan .................... G07C 5/008 340/426.13

(Continued)

FOREIGN PATENT DOCUMENTS

JP S6237479 A 2/1987
JP 2007046342 A 2/2007

(Continued)

OTHER PUBLICATIONS

Japanese Patent Office, Office Action with English translation and pending claims for the corresponding Japanese Patent Application No. 2014-087964 dated Mar. 3, 2015.

(Continued)

*Primary Examiner* — George Bugg
*Assistant Examiner* — Anthony D Afrifa-Kyei
(74) *Attorney, Agent, or Firm* — Brooks Kushman P.C.

(57) ABSTRACT

A system includes a base station, a communications device, and a fob. The base station is configured to control a vehicle function in response to receiving a command via a first wireless link. One of the communications device and the fob is configured to transmit a request via a second wireless link different than the first wireless link. The other one of the communications device and the fob is configured to transmit the command to the base station via the first wireless link in response to receiving the request via the second wireless link.

7 Claims, 3 Drawing Sheets

(56) References Cited

U.S. PATENT DOCUMENTS

| | | | | |
|---|---|---|---|---|
| 2010/0321203 | A1* | 12/2010 | Tieman | B60R 25/24 340/870.01 |
| 2012/0306618 | A1 | 12/2012 | Tieman et al. | |
| 2013/0137372 | A1 | 5/2013 | Nishidai | |
| 2013/0237174 | A1* | 9/2013 | Gusikhin | H04W 4/22 455/404.1 |
| 2013/0237189 | A1* | 9/2013 | Nishidai | H04W 12/06 455/411 |
| 2014/0176301 | A1* | 6/2014 | Fernandez Banares | G07C 9/00015 340/5.26 |
| 2014/0188348 | A1* | 7/2014 | Gautama | B60W 10/30 701/48 |

FOREIGN PATENT DOCUMENTS

| | | | |
|---|---|---|---|
| JP | 2008255702 | A | 10/2008 |
| JP | 2009257027 | A | * 11/2009 |
| JP | 2010168010 | A | 8/2010 |
| JP | 2013110687 | A | 6/2013 |

OTHER PUBLICATIONS

Japanese Patent Office, Japanese Office Action for Japanese Patent Application No. 2015-142548, dated Aug. 31, 2016.

Japanese Patent Office, Notification of Reasons for Refusal (Translation) for corresponding Japanese Patent Application 2015-142548, dated Aug. 31, 2016.

* cited by examiner

REMOTE CONTROL SYSTEMS FOR VEHICLES

CROSS-REFERENCE TO RELATED APPLICATIONS

This application claims the benefit of U.S. Provisional Application No. 61/814,370 filed Apr. 22, 2013, the disclosure of which is hereby incorporated in its entirety by reference herein.

TECHNICAL FIELD

The present invention relates generally to remote keyless entry systems for remotely controlling vehicle functions.

BACKGROUND

A remote keyless entry system for a vehicle typically includes a portable remote control unit and a base station. The portable remote control unit such as a key fob is carried by an operator of the vehicle. The base station is mounted in the vehicle. The fob may have buttons or the like which when actuated by the operator causes a transmitter in the fob to transmit a corresponding command signal to the base station. The base station includes a receiver to receive the command signal from the fob. The base station validates and decodes from the received command signal the requested vehicle function to be executed and causes the appropriate vehicle system to perform the requested vehicle function. Vehicle functions which may be controlled in this manner include locking and unlocking the vehicle doors, opening the vehicle truck, sounding a vehicle alarm or formed in an emergency, and vehicle immobilizer, keyless engine start, remote start, vehicle locating functions, etc.

SUMMARY

An embodiment of the present invention provides a system having a base station, a communications device, and a fob. The base station is configured to control a vehicle function in response to receiving a command via a first wireless link. The communications device is configured to transmit a request via a second wireless link different than the first wireless link. The fob is configured to transmit the command to the base station via the first wireless link in response to receiving the request from the communications device via the second wireless link.

The first wireless link may be a traditional type of wireless link used for remote keyless entry and passive entry systems and the second wireless link may be one of a Bluetooth$^{SM}$ wireless link, a wifi wireless link, and a wimax wireless link.

The communications device may be a portable phone capable of cellular communications over a communications line not involving the wireless links. The communications device may be one of a phone, a tablet, and a computer.

The communications device may be configured to transmit the request via the second wireless link upon being actuated by a user. The communications device may be configured to transmit the request via the second wireless link passively without user actuation.

An embodiment of the present invention provides another system having a base station, a communications device, and a fob. The base station is configured to control a vehicle function upon receiving a command via a first wireless link. The fob is configured to transmit a request via a second wireless link different than the first wireless link. The communications device is configured to transmit the command to the base station via the first wireless link in response to receiving the request from the fob via the second wireless link.

In an embodiment, the first wireless link is a cellular wireless link and the second wireless link is a non-cellular wireless link.

The first wireless link may be a cellular wireless link and the second wireless link may be one of a Bluetooth$^{SM}$ wireless link, a wifi wireless link, and a wimax wireless link.

Another embodiment of the present invention provides a method. The method includes transmitting a request from a fob to a communications device via a first wireless link. The method further includes transmitting a command from the communications device to a base station via a second wireless link different than the first wireless link in response to the communications device receiving the request from the fob via the first wireless link. The method further includes controlling by the base station a vehicle function in response to the base station receiving the command from the communications device via the second wireless link.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
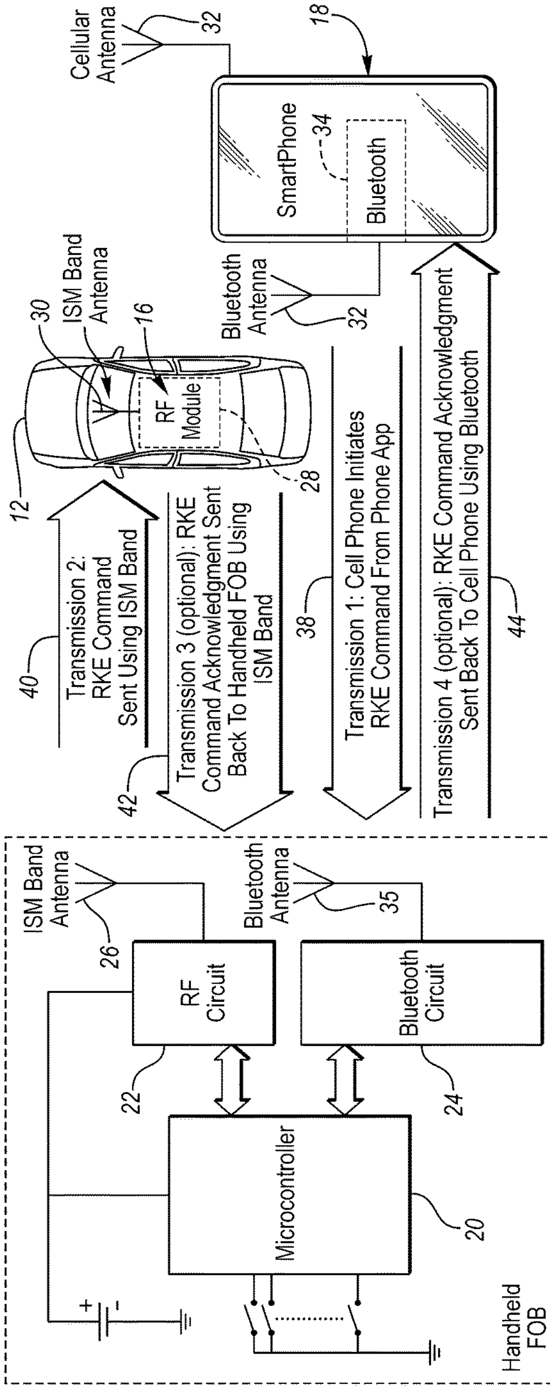
FIG. 1 illustrates a block diagram of a remote control system in accordance with an embodiment of the present invention.

FIG. 1 illustrates a block diagram of a remote control system 10 in accordance with an embodiment of the present invention. Remote control system 10 includes a portable remote control unit 14 such as a fob, a base station 16 mounted in a vehicle 12, and a handheld smart phone 18.

Remote control system 10 is operable for controlling various functions of vehicle 12 such as locking and unlocking the doors of the vehicle, arming and disarming vehicle alarms, opening the trunk of the vehicle, remotely starting the engine of the vehicle, etc. In this regard, fob 14 is configured to wirelessly transmit a command signal to base station 16. The command signal is indicative of a vehicle function requested to be executed. Such command signals may be those associated with remote keyless entry (RKE), passive entry (PE), etc. Base station 16 validates a command signal received from fob 14 and decodes the command signal to identify the requested vehicle function. Base station 16 then controls or directs the control of the requested vehicle function.

Fob 14 is to be carried by an operator of vehicle 12. As shown in FIG. 1, fob 14 includes a microcontroller 20, a radio frequency (RF) communications circuit 22, and a Bluetooth communications circuit 24. RF circuit 22 includes a transmitter and an associated RF antenna 26. The transmitter of RF circuit 22 is configured to transmit vehicle function command signals via RF antenna 26 to base station 16 of vehicle 12. For instance, RF circuit 22 transmits command signals over the industrial, scientific and medical (ISM) radio band (i.e., a RF wireless link) to base station 16.

Microcontroller 20 is configured to control communications RF circuit 22 and Bluetooth circuit 24. Microcontroller 20 controls RF circuit 22 to transmit desired command signals to base station 16 of vehicle 12 in response to operator actuation of fob 14 and/or passive operation of fob 14 without operator actuation. As explained in greater detail below, microcontroller 20 controls RF circuit 22 to transmit desired command signals to base station 16 in response to operator actuation of phone 18.

As shown in FIG. 1, base station 16 includes a RF communications module 28 and an associated RF antenna 30. RF module 28 includes a receiver configured to receive via RF antenna 30 the command signals wirelessly transmitted from the transmitter of RF circuit 22 of fob 14 over the RF wireless link. Base station 16 includes further hardware operable for validating the command signals received from fob 14, decoding the command signals to identify the requested vehicle functions, and controlling or directing the control of the requested vehicle functions.

Phone 18 is intended to be carried by the operator of vehicle 12 with fob 14. Phone 18 is a typical smart phone having "app" functionality and is configured to carry out ordinary cell phone communications via a cellular antenna 32.

Phone 18 further includes a Bluetooth communications circuit 34. Bluetooth circuit 34 includes a transmitter and an associated Bluetooth antenna 36. The transmitter of Bluetooth circuit 34 is configured to transmit command initiation signals via Bluetooth antenna 36 to fob 14. Bluetooth circuit 34 transmits the initiation signals to fob 14 via a Bluetooth wireless link. Bluetooth circuit 24 of fob 14 includes an associated Bluetooth antenna 35 and is configured to receive the initiation signals from phone 18 over the Bluetooth wireless link.

As indicated above, in fob 14, microcontroller 20 controls RF circuit 22 to transmit desired command signals to base station 16 of vehicle 12 in response to operator actuation of phone 18. Such operator actuation of phone 18 causes phone 18 to transmit a command initiation signal to fob 14 over the Bluetooth wireless link. The initiation signal corresponds to a desired vehicle function to be executed. Microcontroller 20 of fob 14 converts the initiation signal into the corresponding command signal for executing the vehicle function and then controls RF circuit 22 to transmit the corresponding command signal to base station 16.

As shown in FIG. 1, the signal transmission operation of remote control system 10 will be described in further detail. A first transmission 38 occurs over the Bluetooth wireless link from phone 18 to fob 14. First transmission 38 involves phone 18 initiating a RKE command signal from an RKE application (i.e., "app") on phone 18. A second transmission 40 occurs over the RF wireless link from fob 14 to base station 16 of vehicle 12. Second transmission 40 involves fob 14 transmitting the RKE command signal to base station 16. In turn, base station 16 controls or directs the control of the vehicle function requested by the RKE command signal as described above. As such, in this case, operator actuation of phone 18 as opposed to operator actuation of fob 14 causes the requested vehicle function to be executed remotely.

The signal transmission operation of remote control system 10 may further include a third transmission 42 and a fourth transmission 44. Third transmission 42 involves base station 16 transmitting an acknowledgment signal over the RF wireless link to fob 14. The acknowledgment signal acknowledges receipt by base station 16 of the RKE command signal from the fob 14. Fourth transmission 44 involves fob 14 transmitting an acknowledgment signal over the Bluetooth wireless link to phone 18. This acknowledgment signal acknowledges receipt by fob 14 of the RKE command signal initiated from phone 18 and/or receipt by base station 16 of the RKE command signal.

Figure 2:
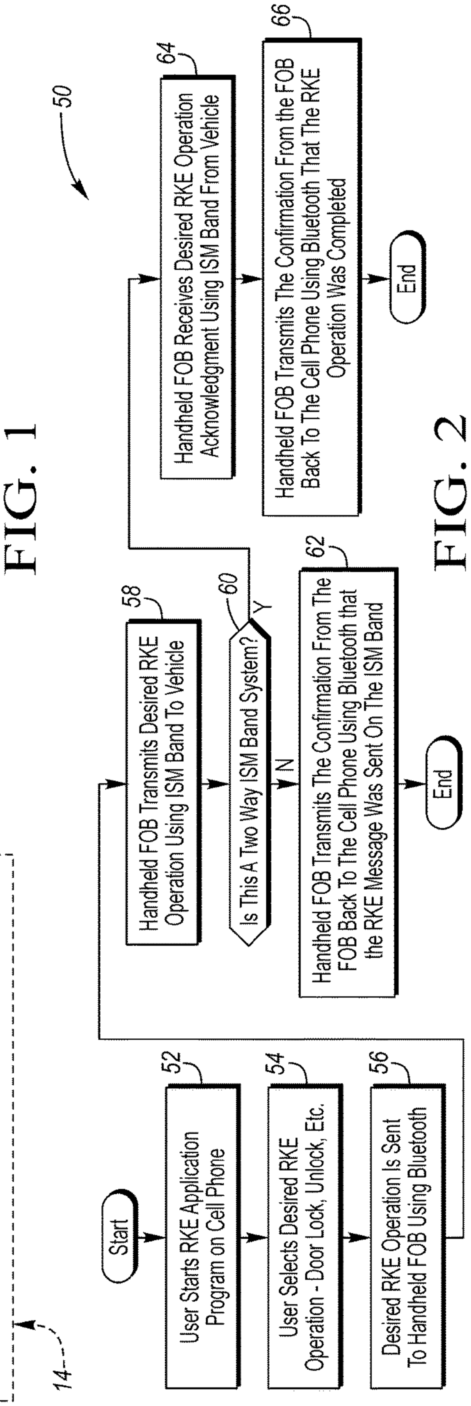
FIG. 2 illustrates a flowchart describing the operation of the remote control system shown in FIG. 1.

Referring now to FIG. 2, with continual reference to FIG. 1, a flowchart 50 describing the operation of remote control system 10 is shown. Initially, phone 18 is paired with fob 14 using the Bluetooth wireless link. Once paired, a RKE Application of phone 18 provides a graphical user interface (GUI) for typical keyless functions such as remote start, lock/unlock, panic, and display vehicle data such as remote start status. As described above, actual vehicle communication is provided between fob 12 and vehicle 18 (i.e., base station 16) using the existing vehicle RKE system.

As shown in FIG. 2, the operation of remote control system 10 continues with an operator of phone 18 operating the RKE Application of phone 18 as indicated in block 52. The operator selects the desired RKE operation from the GUI of the RKE Application as indicated in block 54. Phone 18 then transmits an initiation signal indicative of the desired RKE operation to fob 14 over the Bluetooth wireless link as indicated in block 56 (i.e., first transmission 38). In turn, fob 14 transmits the command signal indicative of the desired RKE operation to base station 16 over the RF wireless link as indicated in block 58 (i.e., second transmission 40). Base station 16 then carries out the vehicle function corresponding to the command signal.

A decision is made in block 60 as to whether the RF wireless link between fob 14 and base station 16 is a two-way communication link (i.e., whether base station 16 is configured to transmit signals to fob 14 over the RF wireless link and/or whether fob 14 is configured to receive signals from base station 16 over the wireless link). If the decision in block 60 is no meaning that the two-way communication link is absent, then the operation continues with fob 14 transmitting an acknowledgment signal to phone 18 over the Bluetooth wireless link (e.g., fourth transmission 44). This acknowledgment signal is a confirmation from fob 14 that fob 14 transmitted the RKE command signal to the base station 16 as indicated in block 62

If the decision in block 60 is yes meaning that the two-way communication link is present, then the operation continues with base station 16 transmitting an acknowledgment signal to fob 14 over the RF wireless link as indicated in block 64 (i.e., third transmission 42) and fob 14 in turn transmitting an acknowledgment signal to phone 18 over the Bluetooth wireless link as indicated in block 66 (i.e., fourth transmission 44).

As described and illustrated, remote control system 10 provides a smartphone to vehicle RKE keyfob link for keyless functions functionality. This functionality provides a smart phone RKE experience that does not require a non-traditional (e.g., cellular, Bluetooth) wireless receiver or transceiver in base station 16 and/or vehicle 12. Remote control system 10 uses the existing Bluetooth/BLE hardware in a smart phone to allow pairing of the phone with a standard vehicle key fob. Once paired, an App on the phone provides a GUI for typical keyless functions. Actual vehicle communication is provided between the fob and the vehicle (i.e., the base station) using the existing vehicle RKE system. User experience factors could direct a miniature fob with no buttons for size or could maintain buttons to provide basic functionality without the smart phone.

Figure 3:
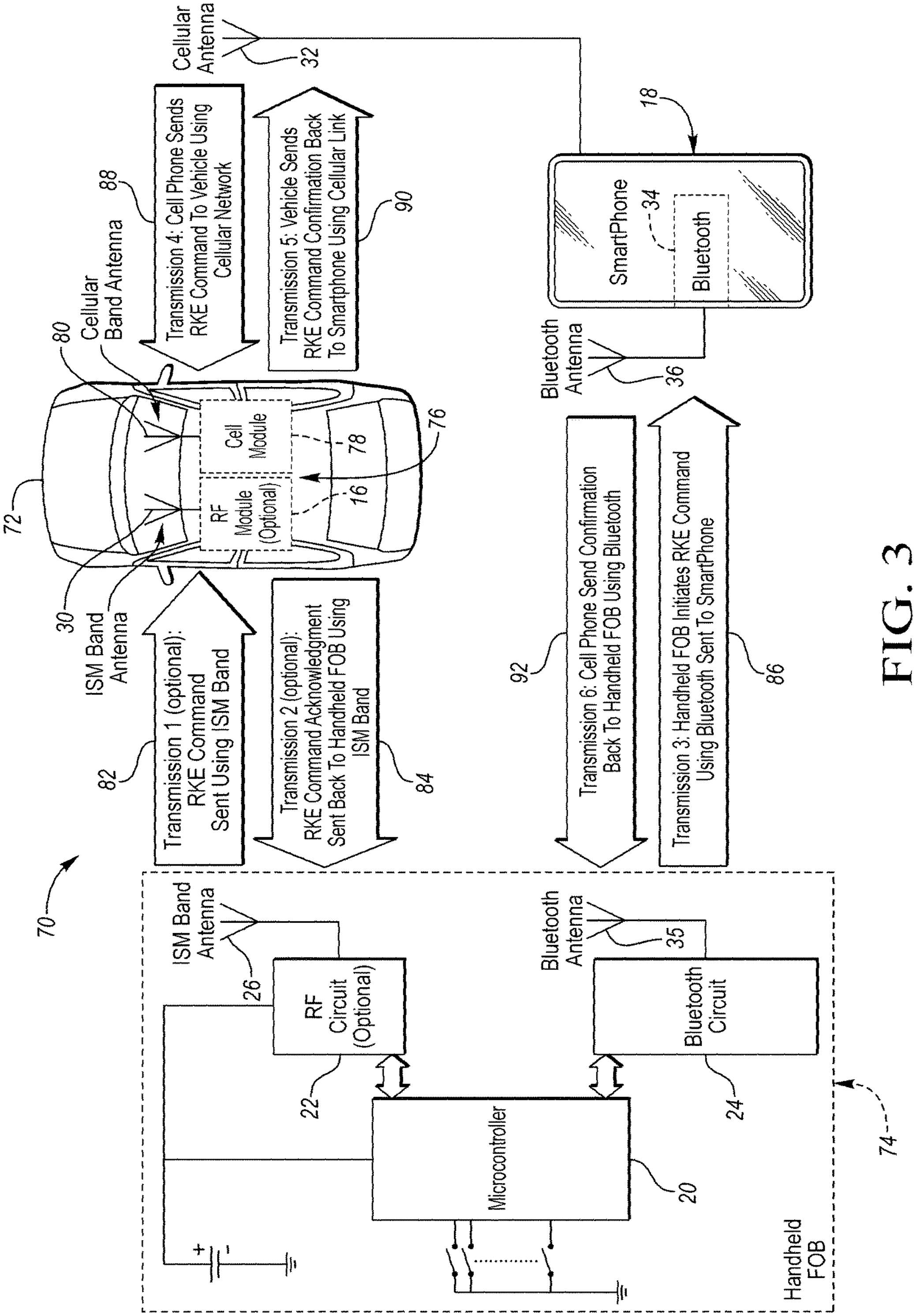
FIG. 3 illustrates a block diagram of a remote control system in accordance with another embodiment of the present invention.

Referring now to FIG. 3, with continual reference to FIG. 1, a block diagram of a remote control system 70 in accordance with another embodiment of the present invention is shown. Remote control system 70 includes a fob 74, a base station 76 in a vehicle 72, and phone 18.

Fob 74 includes a microcontroller 20 and a Bluetooth communications circuit 24. Bluetooth circuit 24 of fob 74 includes a transmitter. The transmitter of Bluetooth circuit 24 is configured to transmit vehicle function command signals via Bluetooth antenna 35 to phone 18 over a Bluetooth wireless link. Microcontroller 20 controls Bluetooth circuit 24 to transmit vehicle function command signals to phone 18 in response to operator actuation of fob 74 and/or passive operation of fob 74 without operator actuation.

Phone 18 includes Bluetooth communications circuit 34 with Bluetooth antenna 36. Bluetooth circuit 34 includes a receiver. The receiver of Bluetooth circuit 34 of phone 18 is configured to receive via Bluetooth antenna 36 a command signal wirelessly transmitted from the transmitter of Bluetooth circuit 24 of fob 74 over the Bluetooth wireless link. In turn, phone 18 relays the command signal to base station 76 by wirelessly transmitting the command signal from cellular antenna 32 of phone 18 to base station 76 over a cellular link.

Base station 76 includes a cellular communications module 78 and an associated cellular antenna 80. Cellular module 78 includes a receiver configured to receive via cellular antenna 80 the command signal wirelessly transmitted from phone 18 over the cellular link. Base station 76 further includes hardware operable for validating the command signal received from phone 18, decoding the command signal to identify the requested vehicle function, and controlling or directing the control of the requested vehicle function.

Fob 74 may further include a RF communications circuit 22 having a transmitter. Base station 76 may further include a RF communications module 16 having a receiver. The transmitter of RF circuit 22 of fob 14 is configured to transmit vehicle function command signals via RF antenna 26 to the receiver of RF module 16 of base station 76 over a RF wireless link. Microcontroller 20 of fob 74 controls RF circuit 22 to transmit vehicle function command signals to base station 76 in response to operator actuation of fob 74 and/or passive operation of fob 74 without operator actuation. Base station 76 is configured to validate a command signal received from fob 74, decode the command signal to identify the requested vehicle function, and control or direct the control of the requested vehicle function.

The RF circuit 22 of fob 74 may further include a receiver and the RF module 16 of base station 76 may further include a transmitter. The transmitter of RF module 16 of base station 76 is configured to transmit acknowledgement signals to fob 74 over the RF wireless link. The receiver of RF circuit 22 of fob 74 is configured to receive such acknowledgement signals from base station 76 over the RF wireless link.

As shown in FIG. 3, the signal transmission operation of remote control system 70 will be described in further detail. An optional first transmission 82 occurs over the RF wireless link from fob 74 to base station 76. First transmission 82 involves fob 74 transmitting a RKE command signal to base station 76 over the RF wireless link. An optional second transmission 84 occurs over the RF wireless link from base station 76 to fob 74. Second transmission 84 involves base station 76 transmitting an acknowledgment signal in response to the RKE command signal to fob 14 over the RF wireless link. As such, first and second transmissions 82 and 84 involve typical RKE control processes.

The signal transmission operation of remote control system 70 includes a third transmission 86 occurring over the Bluetooth wireless link from fob 74 to phone 18. Third transmission 86 involves fob 74 initiating a RKE command signal. Fob 74 initiates the RKE command signal in response to operator actuation of the fob and/or in response to passive actuation of the fob occurring without operator actuation of the fob. In either event, fob 74 transmits the RKE command signal to phone 18 over the Bluetooth wireless link.

A fourth transmission 88 occurs over the cellular link from phone 18 to base station 76. Fourth transmission 88 involves phone 18 relaying or transmitting the RKE command signal to base station 76. In turn, base station 76 controls or directs the control of the vehicle function requested by the RKE command signal as described above. As such, in this case, actuation of fob 74 causes a corresponding RKE command signal to be transmitted via phone 18 to base station 76 over a cellular link as opposed to the RKE command signal being directly transmitted via fob 74 to base station 76 over a RF wireless link.

The signal transmission operation of remote control system 70 may further include a fifth transmission 90 and a sixth transmission 92. Fifth transmission 90 involves base station 76 transmitting an acknowledgment signal over the cellular wireless link to phone 18. The acknowledgment signal acknowledges receipt by base station 76 of the RKE command signal from phone 18. Sixth transmission 92 involves phone 18 transmitting an acknowledgment signal over the Bluetooth wireless link to fob 74. This acknowledgment signal acknowledges receipt by phone 18 of the RKE command signal initiated from fob 74 and/or receipt by base station 76 of the RKE command signal.

Figure 4:
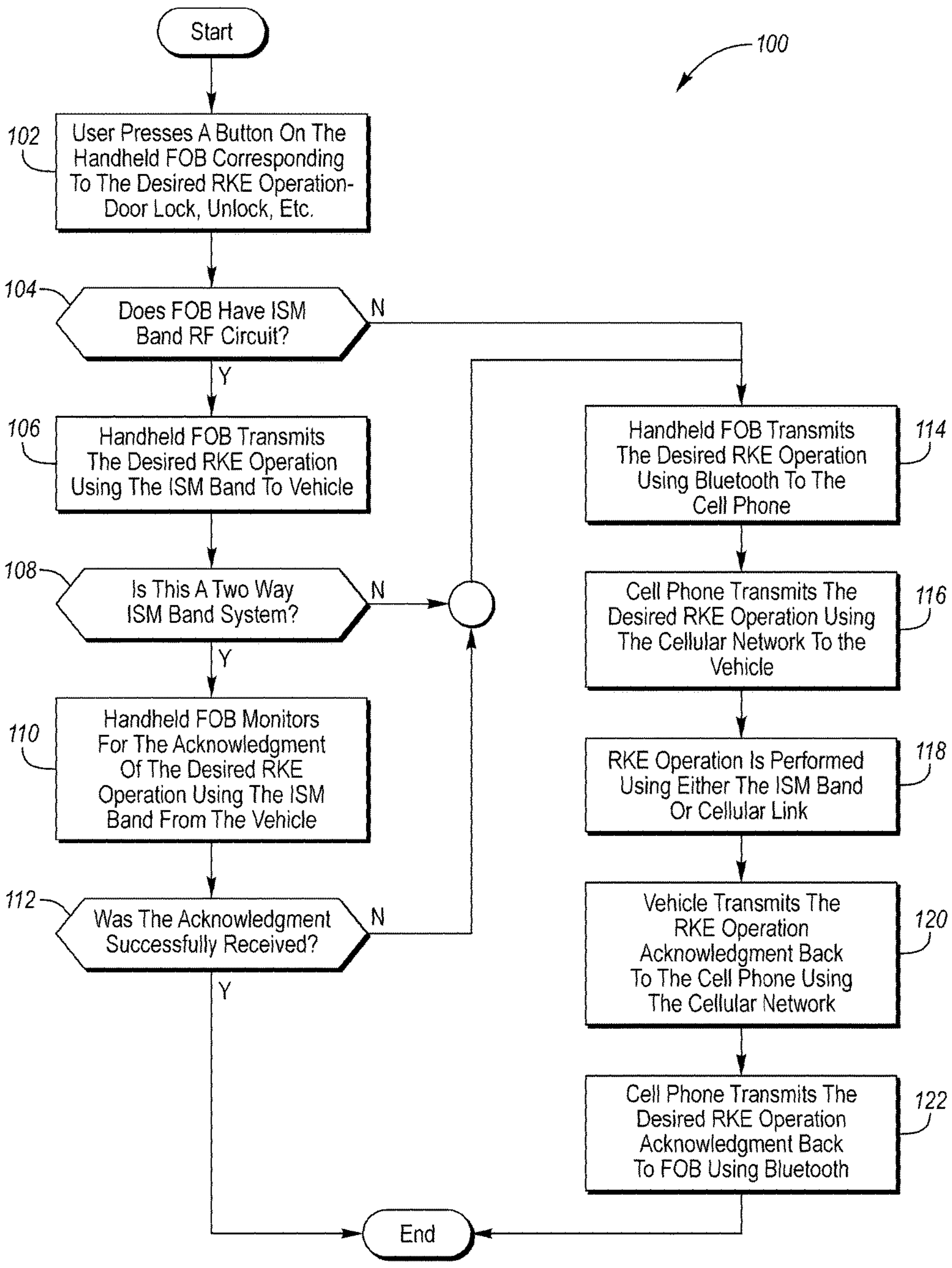
FIG. 4 illustrates a flowchart describing the operation of the remote control system shown in FIG. 3.

Referring now to FIG. 4, with continual reference to FIG. 3, a flowchart 100 describing the operation of remote control system 70 is shown. The operation of remote control system 70 begins with an operator of fob 74 actuating the fob to initiate a desired RKE command signal as indicated in block 102. A decision is made in block 104 as to whether fob 74 is capable of transmitting the RKE command signal directly to base station 76 over a RF wireless link. If yes, then fob 74 transmits the RKE command signal directly to base station 76 over the RF wireless link as indicated in block 106 (i.e., first transmission 82). Base station 76 then carries out the vehicle function corresponding to the RKE command signal. A decision is then made in block 108 as to whether two-way communication between fob 74 and base station 76 is provided over the RF wireless link. If yes, then fob 74 waits to receive an acknowledgment signal from base station 76 over the RF wireless link as indicated in block 100 (i.e., second transmission 84). A decision is made in block 112 as to whether fob 74 successfully received the acknowledgment signal from base station 76. If yes, then the operation terminates until a new RKE command signal is generated.

If fob 74 is not capable of transmitting the RKE command signal directly to base station 76 over a RF wireless link as decided in block 104, then fob 74 transmits the RKE command signal (or transmits a corresponding signal indicative of the RKE command signal) to phone 18 over the Bluetooth wireless link as indicated in block 114 (i.e., third transmission 86). In turn, phone 18 transmits the RKE command signal to base station 76 over the cellular link as indicated in block 116 (i.e., fourth transmission 88). Base station 76 then carries out the vehicle function corresponding to the RKE command signal.

A decision is made in block 118 as to whether the vehicle function corresponding to the RKE command signal has been performed. Upon the corresponding vehicle function being performed, base station 76 transmits an acknowledgment signal to phone 18 over the Bluetooth wireless link (i.e., fifth transmission 90) as indicated in block 120. This acknowledgment signal is a confirmation from base station 76 that the requested vehicle function has been performed. Phone 18 in turn transmits an acknowledgment signal to fob 74 over the Bluetooth wireless link as indicated in block 122 (i.e., sixth transmission 92). The operation then terminates until a new RKE command signal is generated.

As described and illustrated, remote control system 70 provides a Bluetooth enabled RKE using cell phone. Remote control system 70 simplifies the RKE feature, but still uses the cellular link. Remote control system 70 includes a handheld transmitter (e.g., fob 74) for remote keyless entry, which is enabled with Bluetooth interfaces to cell phone application software that performs vehicle functions using the cellular wireless link. As such, remote control system 70 utilizes both the Bluetooth technology and cell phone technology for remote keyless entry products. In operation, an operator only has to retrieve and actuate fob 74 to implement a desired vehicle function. Fob 74 then communicates to phone 18 using Bluetooth technology where the function call is then automatically sent from phone 18 to base station 76 using the cellular link.

It is to be understood that phone 18 in any of the embodiments may be substituted with any other portable or non-portable communications device capable of carrying out cellular communications. Such other portable communications devices include, for example, table computers, laptop computers, and the like. Such other non-portable communications devices include, for example, desktop computers and the like. Further, phone 18 may be substituted with a telephone capable of both wireline and cellular communications.

It is also to be understood that the Bluetooth wireless link between fob 14 and phone 18 in any of the embodiments may be substituted with a wifi wireless link, a wimax wireless link, and the like. In this case, Bluetooth communications circuits 24 and 34 of fob 14 and phone 18, respectively, are both substituted with appropriate communications circuits. For example, if the wireless link between fob 14 and phone 18 is a wifi wireless link, then communications circuits 24 and 34 are respectively wifi communications circuits.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for a vehicle, comprising:

a fob;

a base station mounted in a vehicle and configured to control a vehicle function of the vehicle in response to receiving a passive entry command via a first wireless link;

a communications device configured to transmit a request directly to the fob via a second wireless link different than the first wireless link, the request being for the passive entry command to be transmitted from the fob directly to the base station, the communications device being configured to transmit the request via the second wireless link passively without user actuation of the communications device pursuant to passive entry operation; and the fob configured to transmit the command directly to the base station via the first wireless link in response to receiving the request from the communications device via the second wireless link.

2. The system of claim 1 wherein:

the first wireless link is a wireless link other than a Bluetooth$^{SM}$ wireless link and the second wireless link is a Bluetooth$^{SM}$ wireless link.

3. The system of claim 1 wherein:

the first wireless link is a wireless link other than a wifi wireless link and the second wireless link is a wifi wireless link.

4. The system of claim 1 wherein:

the first wireless is a wireless link other than a wimax wireless link and the second wireless link is a wimax wireless link.

5. The system of claim 1 wherein:

the communications device is a portable phone capable of cellular communications over a communications line not involving the first and second wireless links.

6. The system of claim 1 wherein:

the communications device is one of a phone, a tablet, and a computer.

7. The system of claim 1 wherein:

the communications device is further configured to transmit the request via the second wireless link upon being actuated by a user.

* * * * *